Dec. 22, 1936.     T. H. FAWCETT     2,065,217
LOCOMOTIVE DRIVING WHEEL
Filed April 13, 1933     2 Sheets-Sheet 1
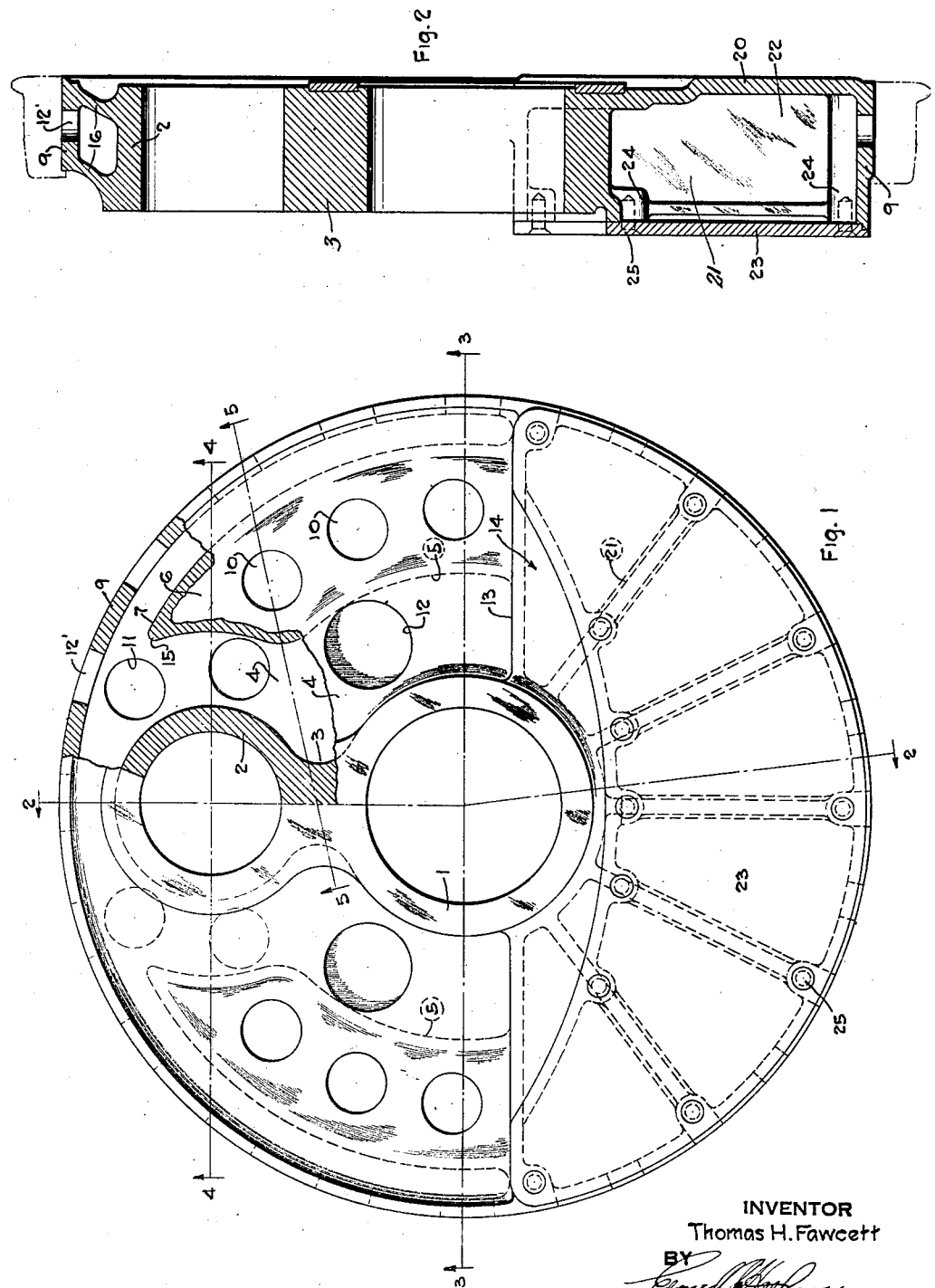
INVENTOR
Thomas H. Fawcett
BY
ATTORNEY Dec. 22, 1936.　　　　T. H. FAWCETT　　　　2,065,217
LOCOMOTIVE DRIVING WHEEL
Filed April 13, 1933　　　2 Sheets-Sheet 2
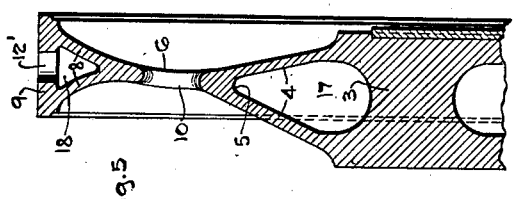
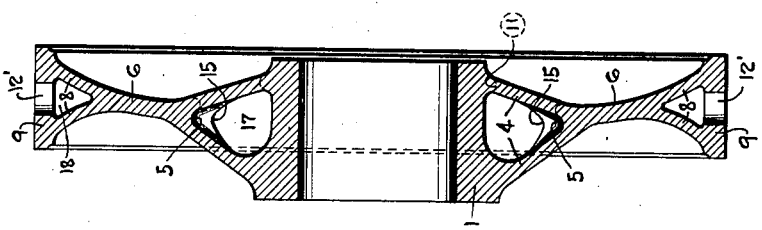
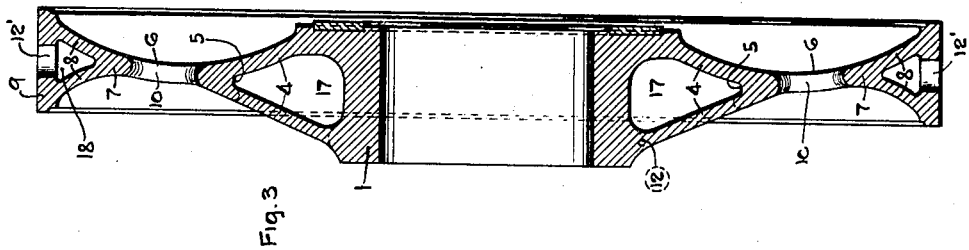
INVENTOR
Thomas H. Fawcett
BY
ATTORNEY Patented Dec. 22, 1936

2,065,217

UNITED STATES PATENT OFFICE 2,065,217

LOCOMOTIVE DRIVING WHEEL

Thomas H. Fawcett, Philadelphia, Pa.

Application April 13, 1933, Serial No. 665,980

9 Claims. (Cl. 295—2)

This invention relates generally to locomotive driving wheels and more particularly to an improved form and arrangement of elements in a semi-disc cast type of driving wheel.

It is well-known that locomotive driving wheels are subjected to extremely severe service conditions not only from the standpoint of resisting load and impact forces but also the driving forces applied to the crankpin. Due to the peculiar combination of stresses set up in a driving wheel, it has heretofore been found that one of the weak points of the wheel is between the axle and crankpin hubs notwithstanding that in usual practice the juncture of these hubs is considerably enlarged and the hubs and rim are supported by spokes radiating in directions so as to most effectively resist all combined stresses. However to overcome the above difficulty merely by making the parts heavier causes further difficulties such as improper weight distribution resulting in extreme difficulty in effecting proper counterbalancing of the two sets of driving wheels on each side of the locomotive.

It is one object of my invention to provide an improved locomotive driving wheel which will have a more favorable weight distribution so as to permit more perfect counterbalancing and yet will insure maximum strength of not only the wheel in general but also of the axle and crankpin hubs and the juncture therebetween.

I specifically accomplish the foregoing object by providing a semi-disc type of driving wheel with a double wall hollow portion immediately surrounding at least a portion of preferably both the axle and crankpin hubs at their point of juncture, whereby said hubs may be made not only considerably lighter in weight than has heretofore been possible in practice but also the juncture of said hubs may be considerably necked down, thereby appreciably reducing the weight in the crankpin side of the wheel without reducing the strength thereof. As a result of this improved construction the wheels may be effectively counterbalanced against the driving mechanisms on each side of the locomotive, this being impossible with prior art wheels, under certain conditions, because of the large amount of weight in the crankpin side of the wheel which is necessary to insure proper strength in such wheels.

In another specific aspect of the invention I have provided an improved locomotive driving wheel of the semi-disc type having a double wall hollow portion immediately adjacent the wheel rim at least for a portion of the wheel circumference, while another portion of the circumference is adapted for counterbalancing purposes, the double wall hollow portions, which are immediately adjacent the rim and hubs, being preferably of triangular form in cross-section connected at their apices by a single thickness or disc portion. The bases of the triangular sections merge with the rim and hubs along axially spaced circumferential lines, although the perimeter of the hubs is of irregular shape with a pronounced neck between the same.

Other objects and advantages will be more apparent to those skilled in the art from the following description of the accompanying drawings in which:

Fig. 1 is a side elevation of my improved locomotive driving wheel with parts broken away to show details of construction;

Fig. 2 is a vertical section taken on the line 2—2 of Fig. 1;

Fig. 3 is a horizontal section taken on the line 3—3 of Fig. 1;

Fig. 4 is a section taken on the line 4—4 of Fig. 1;

Fig. 5 is a section taken on the line 5—5 of Fig. 1.

The specific embodiment of the invention, as shown herein, is merely for purposes of illustrating the principle thereof and of disclosing one form among possible others that the invention might take. This particular form of driving wheel is of cast material and comprises an axle hub 1 and crankpin hub 2 each of which has preferably a uniform radial thickness throughout its circumference except at the point of juncture therebetween represented by a substantially reduced neck portion 3. In usual practice this neck is very substantially filled out, most often to the point where it is a straight line tangent to the periphery of the two hubs thereby to provide necessary strength between the hubs although accompanied by an undesirable increase of weight. However, in my improved arrangement I avoid the above additional weight and thereby permit more perfect counterbalancing while at the same time maintaining necessary strength at the juncture of the hubs, and in the wheel in general. To accomplish this, means are provided for connecting said hubs and rim including double walls 4 of triangular cross-section, this double wall extending around at least a portion of the circumference of each of the hubs 1 and 2 and across the reduced neck 3 as shown in Fig. 5 which is a section on line 5—5 of Fig. 1. The base of this triangular section merges with said hubs along axially spaced lines while the apex 5 merges into the apex 7 of a double wall 8 also of triangular formation. The base of this latter triangular section merges with a wheel rim 9. Suitable openings 10 may be provided in the disc portion 6 for purposes of reducing weight while openings 11, 12, and 12' may be provided in the double walls 4 and rim 9 for purposes of either reducing weight or removing cores after casting of the wheel.

It will be noted from Fig. 1 that the triangular walls 4 extend around at least an appreciable portion of the hubs 1 and 2 as by commencing at one of the chordal lines 13 of a counterbalance pocket generally indicated at 14 from which the double wall extends upwardly around hub 1, across neck 3 and around hub 2 to a point 15 where it merges with the apex 7 of the triangular walls 8. As shown in Fig. 2 the walls 4 and 8 then merge into common spaced walls 16 which continue over the top of crankpin hub 2. It will be understood that the upper half of the wheel as shown in Fig. 1 is symmetrical about a vertical center line passing through the axes of the hubs 1 and 2.

From the foregoing disclosure it is seen that the recesses 17 and 18 formed respectively between each set of walls 4 and 8, extend down to the chordal line 13 of the counterbalance pocket, the disc portion 6 similarly extending thereto. Maximum strength is thereby imparted to the hubs and the juncture therebetween which is normally a weak point in the spoke type wheel and in addition the wheel may be made extremely light, in that half of the wheel carrying the crankpin, without in any way reducing the efficiency, strength or safety of the wheel and without introducing casting strains.

As a result, my improved wheel may be counterbalanced most effectively by the provision of any suitable counterbalance pocket 14 which herein specifically comprises an inner flat plate portion 20 formed substantially as a continuation of the inner wall 4 and disc 6 while a series of divisional radial ribs 21 connect the hub wall 20 and rim 9 to provide the necessary hollow space 22 in which lead or other counterbalancing material may be disposed. A counterbalance cover plate 23 may be suitably secured to lugs 24 as by bolts 25 or other suitable holding means.

Due to my improved construction I am able most effectively to counterbalance the wheel against the driving mechanism on each side of the locomotive because the minimum weight of the wheel on the crankpin side thereof permits a greater percentage of any counterbalancing weight to be devoted to actual counterbalancing effects while at the same time I have maintained maximum strength and safety.

It will of course be understood that various changes may be made in the details of construction and arrangement of parts without departing from the spirit of the invention as set forth in the appended claims.

I claim:

1. A locomotive driving wheel having axle and crankpin hubs joined together by a reduced neck, a rim, and means connecting said rim and hubs including a double wall hollow portion of substantially triangular cross-section, said double walls extending around at least a portion of said hubs and across the neck thereof.

2. A locomotive driving wheel having axle and driving pin hubs joined with a reduced neck portion, a rim, and means connecting said hubs and rim including a double wall hollow portion of triangular cross-section extending around said axle hub and inwardly to said neck and then outwardly around said crankpin hub.

3. A locomotive driving wheel comprising, in combination, axle and driving pin hubs, a rim, and means for connecting said hubs and rim including a double wall hollow portion connected to and extending around at least a portion of said hubs, another double wall hollow portion connected to and extending around at least a portion of the inner circumference of said rim, said double walls merging into a common double wall portion which extends between said rim and crankpin hub to connect the same.

4. A locomotive driving wheel comprising, in combination, axle and driving pin hubs, a rim, and means for connecting said hubs and rim including a double wall hollow portion of triangular cross-section connected to and extending around at least a portion of said hubs, another double wall hollow portion of triangular cross-section connected to and extending around at least a portion of the inner circumference of said rim, said double walls merging into a common double wall portion which extends between said rim and crankpin hub to connect the same.

5. A locomotive driving wheel comprising, in combination, axle and driving pin hubs, a rim, and means for connecting said hubs and rim including a double wall hollow portion of triangular cross-section connected to and extending around at least a portion of said hubs, another double wall hollow portion of triangular cross-section connected to and extending around at least a portion of the inner circumference of said rim, said double walls merging into a common double wall portion having substantially vertical sides which extend between said rim and crankpin hub to connect the same.

6. The combination set forth in claim 5 further characterized in that said double wall hollow portions adjacent the hubs and rim are of substantially triangular cross-section with their respective bases connected to said hub and rim, and a single wall or disc portion connecting the apexes of said triangular portions.

7. A locomotive driving wheel comprising, in combination, axle and driving pin hubs, a rim, means for connecting said hubs and rim including a double wall hollow portion connected to and extending around at least a portion of said hubs, another double wall hollow portion connected to and extending around at least a portion of the inner circumference of said rim, said double walls merging into a common double wall portion which extends between said rim and crankpin hub to connect the same, and means forming a counterbalance pocket on the opposite side of said hub from said crankpin hub, and the walls of said hollow portions merging into said counterbalancing means.

8. The combination set forth in claim 7 further characterized by the provision of divisional radial ribs in said counterbalanced pocket.

9. A locomotive driving wheel having axle and crankpin hubs joined together by a reduced neck, a rim, and means for connecting said rim and hubs including a double wall extending around at least a portion of said hubs and across the neck thereof.

THOMAS H. FAWCETT.